(No Model.)
J. P. SCHÜSSLER, Jr. & H. C. KERSTEN.
COMBINED MEASURE AND FUNNEL.
No. 285,168. Patented Sept. 18, 1883.
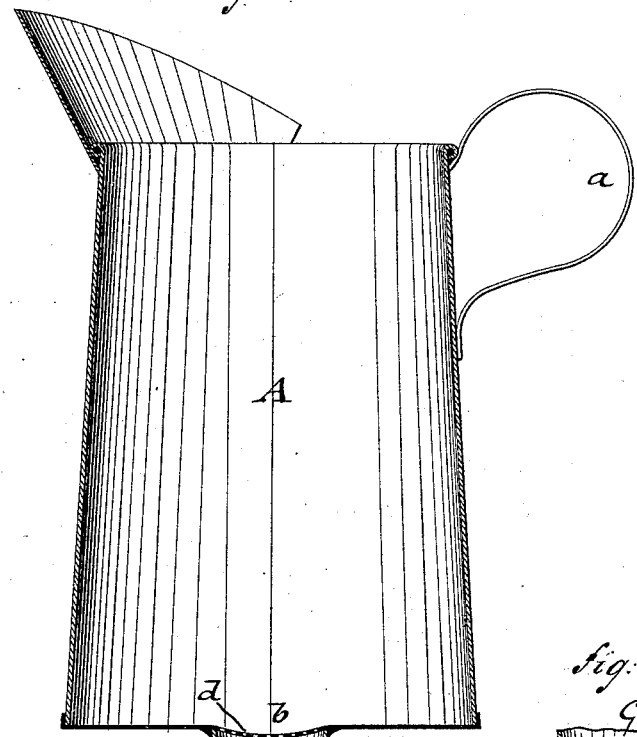
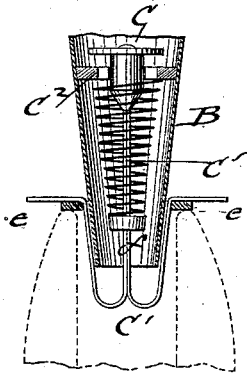
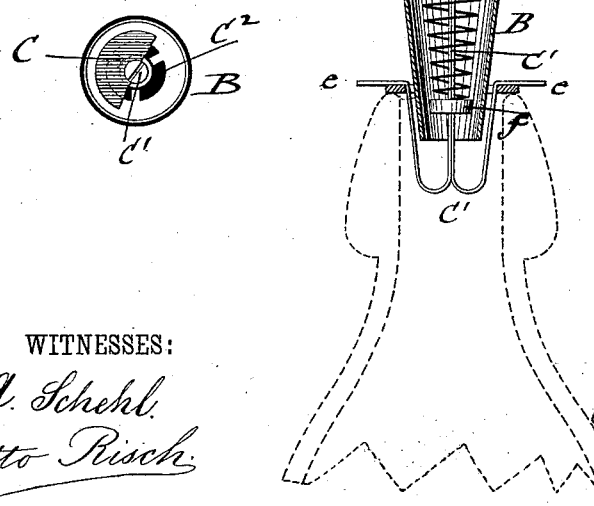
WITNESSES:
A. Schehl
Otto Risch
INVENTORS
John P. Schüssler jr.
Henry C. Kersten
BY Goepel & Raegener
ATTORNEYS.

UNITED STATES PATENT OFFICE.

JOHN P. SCHÜSSLER, JR., AND HENRY C. KERSTEN, OF NEW YORK, N. Y.

COMBINED MEASURE AND FUNNEL.

SPECIFICATION forming part of Letters Patent No. 285,168, dated September 18, 1883.

Application filed May 17, 1883. (No model.)

*To all whom it may concern:*

Be it known that we, JOHN P. SCHÜSSLER, Jr., and HENRY C. KERSTEN, both of the city, county, and State of New York, have invented certain new and useful Improvements in Combined Measures and Funnels, of which the following is a specification.

This invention has reference to an improved measuring-vessel for liquids, with which is combined a funnel, so that the liquids may be transferred without spilling to a bottle or other vessel; and the invention consists of a measuring-vessel having a bottom opening and valved discharge-spout, the valve being provided with means for opening the same quickly, as will appear more fully hereinafter, and finally be pointed out in the claim.

In the accompanying drawings, Figures 1 and 2 represent vertical transverse sections of our improved combined measure and funnel, showing the valve of the funnel respectively in closed and opened position; and Fig. 3 is a horizontal section on line $y\ y$, Fig. 1.

Similar letters of reference indicate corresponding parts.

A in the drawings represents a measuring-vessel of any suitable material, shape, and size, according to the quantity to be measured off thereby. The vessel A is provided with a handle, $a$, and with a bottom opening, $b$, that is preferably covered by a strainer, $d$, to retain any coarser impurities. Below the bottom opening, $b$, extends in downward direction a funnel, B, which is closed by a spring-actuated valve, C, the stem $C'$ of which is extended below the funnel and divided in two parts, which are bent in upward direction and attached at diametrically-opposite points to a ring, $e$.

When the vessel A is filled and the contents are to be discharged into a bottle or other vessel, the funnel is placed on the mouth of the bottle and the measure pressed down upon it, so that the valve C will be opened by the pressure of the ring $e$ and stem $C'$ on the valve C. The contents of the measure will then be readily discharged.

The spring for operating the valve C is interposed between the valve-seat $C^2$ and a fixed collar, $f$, on the stem $C'$, as shown clearly in Figs. 1 and 2.

Having thus described our invention, we claim as new and desire to secure by Letters Patent—

The combination, with a measuring-vessel, A, having a bottom opening, of the funnel B, a spring-actuated valve, C, and its seat $C^2$, below the bottom of the vessel within the funnel, the stem of the valve, the ring $e$, to which the stem is attached, the fixed collar $f$ on the stem, and the actuating-spring, substantially as described.

In testimony that we claim the foregoing as our invention we have signed our names in presence of two subscribing witnesses.

JOHN P. SCHÜSSLER, JR.
HENRY C. KERSTEN.

Witnesses:
PAUL GOEPEL,
SIDNEY MANN.